United States Patent [19]
Agadzhanian et al.

[11] 3,780,298
[45] Dec. 18, 1973

[54] SCANNING METHOD AND A SCAN MICROSCOPE FOR ITS REALIZATION

[76] Inventors: Zhora Melkonovich Agadzhanian, Puschino, Mikroraion "V", 9, kv. 51, Moskovskaya oblast; Genrikh Romanovich Ivanitsky, ulitsa Festivalnaya, 15, Korpus 4, kv. 12, Moscow; Alvian Matveevich Shamarov, Puschino, Mikroraion "V", 6, kv. 22, Moskovskaya oblast, all of U.S.S.R.

[22] Filed: July 15, 1971

[21] Appl. No.: 162,797

[52] U.S. Cl. ............... 250/202, 356/158, 250/214 R
[51] Int. Cl. ............................................. G05b 1/00
[58] Field of Search ................... 250/202, 83.3 UV, 250/214 R, 219 CR; 356/157, 158; 235/92 V

[56] References Cited
UNITED STATES PATENTS

| | | | |
|---|---|---|---|
| 3,598,978 | 8/1971 | Rempert | 250/202 X |
| 3,401,589 | 9/1968 | Druschel et al. | 250/202 X |
| 3,050,581 | 8/1962 | Bomba et al. | 250/202 X |
| 3,385,245 | 5/1968 | Ramsey et al. | 250/202 X |

*Primary Examiner*—Walter Stolwein
*Attorney*—Eric H. Waters et al.

[57] ABSTRACT

A scanning method in which an object under investigation is stopped as soon as its outline is intersected by the optical axis of a fixed optical system and the outline of the object is traced out. After that, the image of the object is line-scanned within a rectangle in which the image is inscribed, while an indication that the next object has come into view is given by the equality of intersections of the object outline by the optical axis both when the object and when its image are displaced.

A scanning microscope using the above-mentioned method which has a tracing unit to trace out the outline of the object, while a limit-coordinate detector determining the extreme rectangular X- and Y-coordinates of the outline of the object "memorizes" these coordinates in the subsequent line scanning, the travel of the diaphragm of the optical microscope is limited by the extreme rectangular coordinates of the image. In the microscope, provisions are made for resetting the diaphragm to the starting position in which the outline of the object is intersected by the optical axis of the optical microscope, while an intersection counter determining how many times the diaphragm of the optical microscope intersects the outline of the object gives an unambiguous indication when the object leaves the scanned zone.

2 Claims, 4 Drawing Figures

SCANNING METHOD AND A SCAN MICROSCOPE FOR ITS REALIZATION

The present invention relates to methods for reading information about an optical image into a digital computer and to means realizing these methods and, more specifically, to scanning methods and to scanning microscopes for their realization, which are used to determine the optical and geometrical characteristics of objects, for example, in biology to construct a karyotype of chromosomes or histograms of areal distributions of objects.

In prior-art scanning methods the object to be line-scanned is displaced relative to the optical axis of a fixed optical system, the optical signal of this optical system is then converted into an electric signal from which the optical and geometrical characteristics of the object are evaluated.

Also known in the art are scanning microscopes using the above-mentioned methods. These scanning microscopes comprise an optical microscope, a movable stage, a diaphragm located in the plane of the image of the object under test, and a transducer to convert the optical signal into an electric signal carrying information about the optical and geometrical characteristics of the object, and a discrete line-scanner to scan the image of the object along the X- and Y-axes of a rectangular coordinate system.

The above-mentioned scanning microscopes operating by the said methods, accomplish line scanning by moving the stage in increments along the X- and Y-axes. With this form of line scanning, the size of the field containing the objects of interest is limited by the accuracy with which the mechanical assemblies can perform scanning and does not usually exceed 150 microns square. Because of this limitation on the sizes of the field of observation, some of the objects of interest appear in the scanned field only partly, and this falsifies the analysis, such as in constructing histograms for objects distributed over areas.

Moreover, in line scanning, not only the objects of interest, but also the field containing them, is scanned, and the computer is fed with data on all scanned points, irrespective of their information value. Because of this, even simple problems call for computers with a large storage capacity for their solution.

Also known in the art are scanning microscopes using the above-mentioned methods of scanning, in which line scanning occurs in the plane of the image. In this case the size of the field is limited by the field of vision of the optical microscope, so that at the maximum magnification of the microscope, the investigated field, as referred to the plane of the object, likewise does not exceed 150 microns square.

Thus, the limited size of the observed field distorts the analysis because some of the objects are scanned only partly while lack of correlation between the optical information obtained by scanning and the type of scanning results in that a large amount of redundant information is read into the computer.

It is an object of the present invention to provide a scanning method which increases the size of the field containing the objects of interest, without limitation on the resolving power of the optical system.

Another object of the present invention is to provide a scanning method by which each object is scanned in the center of the field of vision of the optical system.

Still another object of the present invention is to provide a scanning microscope using the above-mentioned scanning method and reading into a computer the information obtained by the line scanning of a predetermined area greatly exceeding the field of vision of the optical microscope.

With these and other objects in view, the present invention resides in that in a scanning method based on line scanning of the image of an object under investigation, moved relative to the optical axis of a fixed optical system, with the subsequent conversion of the optical signal of this optical system into an electric signal from which the optical and geometrical characteristics of the object under investigation are evaluated, according to the invention, prior to the line scanning of the image of the object under investigation the latter is moved to the starting position in which the outline of the image of the object is intersected by the optical axis of the optical system, the outline of the image is traced out to determine the points on the outline having extreme X- and Y-rectangular coordinates, and the image of the object is then line-scanned within a rectangle having these points with extremal coordinates on the outline of the image as its apexes.

It is preferable after the image of the object has been line-scanned to move the image of this object so that it takes up a position corresponding to the starting position in which the outline of the object is intersected by the optical axis of the optical system, to displace this image additionally along the line intersecting the optical axis of the optical system, which is parallel with and opposite in direction to the line of travel of the object to the starting position, while counting how many times the outline of the object image is intersected by the optical axis of the optical system, to displace the object image to the starting position, to move the object while counting how many times the outline of the object image is intersected by the optical axis of the optical system, and to compare the two intersection counts.

A scanning microscope operating by the scanning method disclosed herein and comparing an optical microscope, a movable stage, a diaphragm arranged in the plane of the image of the object under investigation, and a transducer to convert the optical signal into an electric signal carrying information about the optical and geometrical characteristics of the object, and a discrete line scanner to line-scan the object along the X- and Y-axes of a rectangular coordinate system, according to the invention, has a tracing unit to trace out the outline of the object under investigation in the image plane, whose input accepts the electric signal from the optical-to-electric transducer, a limit-coordinate detector determining points on the outline of the image of the object under investigation having extreme X- and Y-rectangular coordinates and a control unit electrically connected to the tracing unit, the extreme-coordinate detector, and the discrete line-scanner so that when a signal comes from the tracing unit that a tracing cycle has begun it turns off a stage operating mechanism while after the outline of the image of the object under investigation has been traced out it turns off the tracing unit and turns on the discrete line-scanner, and after the image of the object has been line-scanned, it turns on the stage operating mechanism so that the next object can be searched for, and there is also a diaphragm operating mechanism electrically connected to the tracing unit and the discrete line-scanner.

It is preferable to fit the scanning microscope with a diaphragm-reset unit to bring the diaphragm back to the starting position in which the outline of the image of the object under investigation is intersected by the optical axis of the optical microscope, electrically connected to the tracing unit, the control unit and the diaphragm operating mechanism so that when the image of the object has been line-scanned it activates the diaphragm operating mechanism upon a signal from the control unit.

It is desirable to fit the scanning microscope additionally with an intersection counter determining how many times the diaphragm of the optical microscope intersects the outline of the image of the object under investigation, electrically connected to the tracing unit, the optical-to-electric transducer, and the control unit so that upon a signal coming from the control unit just as the diaphragm resets it actuates the diaphragm operating mechanism, causing it to move the diaphragm from the starting position to a point having the maximum X-coordinate and back, while counting the electric signals with a preset level coming from the optical-to-electric transducer, and also actuates the stage operating mechanism for a correcting search of the next object of interest.

This arrangement of a scanning microscope using the scanning method disclosed herein utilizes the maximum resolving power of the optical microscope without any limitation on the size of the observed field, reads into a computer only information pertinent to the objects of interest, and also eliminates partial coverage of the object in the observed field.

Other objects and advantages of the present invention will be clear from the following description of preferred embodiments when read in conjunction with the accompanying drawings wherein.

Figure 1:
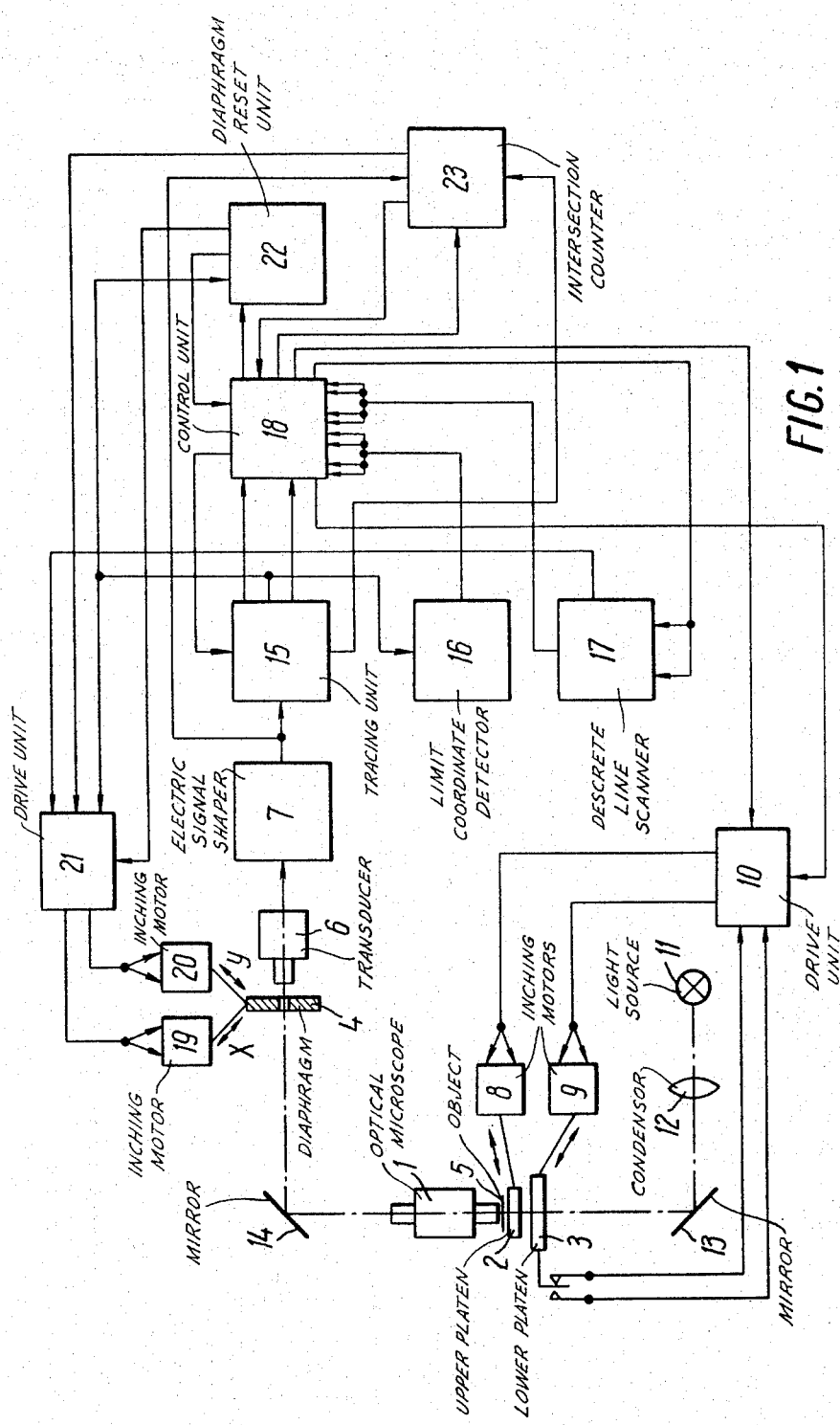
FIG. 1 is a block-diagram of a scanning microscope using a scanning method disclosed herein.
Figure 2:
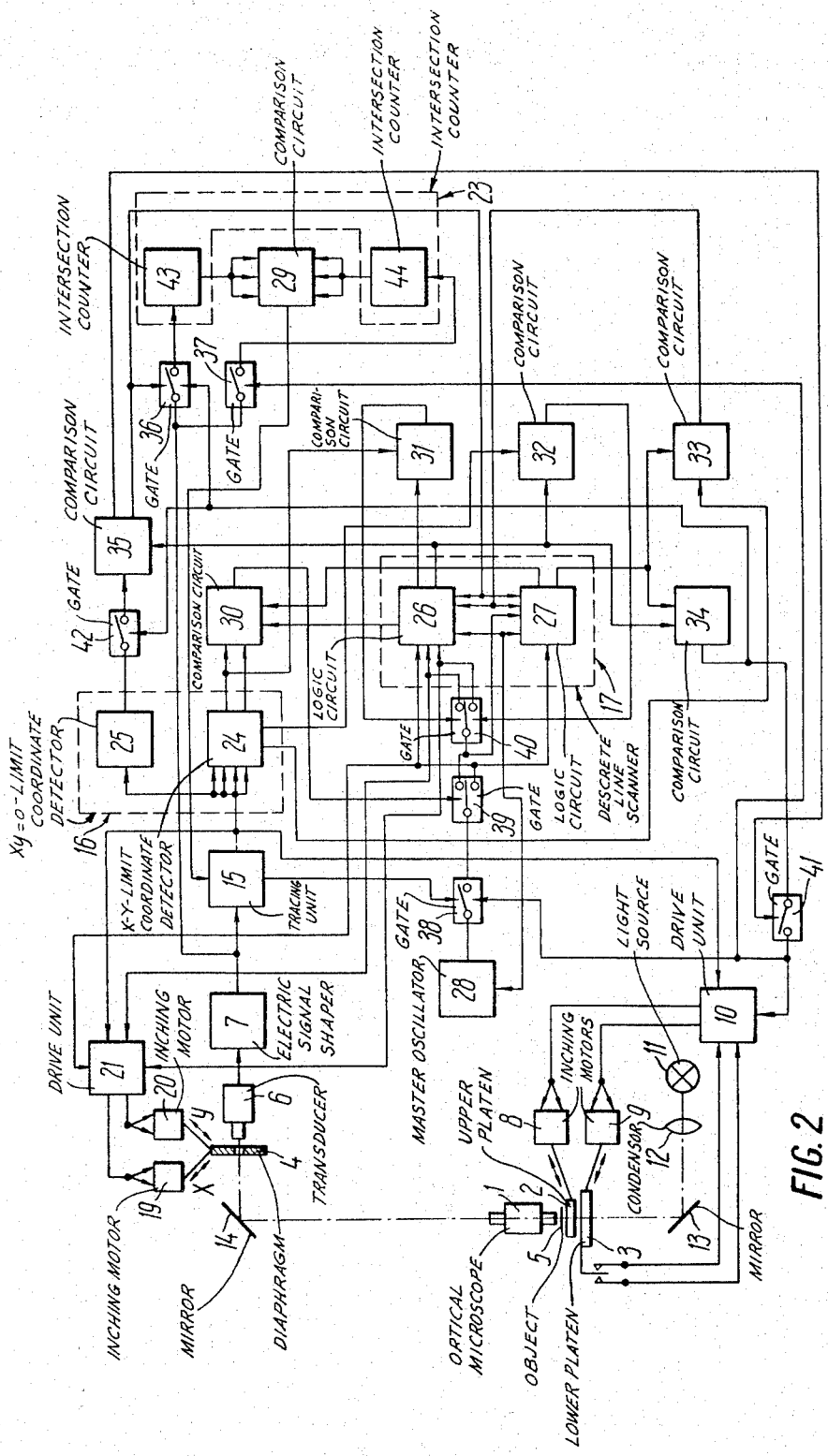
FIG. 2 is a detailed block-diagram of the same microscope.

Referring to FIGS. 1 and 2, there is a scanning microscope using the scanning method disclosed herein, which, according to the invention, comprises an optical microscope 1 which has a stage made up of an upper platen 2 and a lower platen 3, a diaphragm 4 arranged to lie perpendicular to the plane of an object 5 mounted on the top platen 2 of the stage, and a transducer 6 converting the optical signal into an electric signal carrying information about the optical and geometrical characteristics of the object 5, electrically connected to an electric signal shaper 7. The upper platen 2 and the lower platen 3 of the stage are actuated by an operating mechanism consisting of inching motors 8 and 9, respectively, coupled to a drive unit 10, while the lower platen 3 is also coupled to the same unit.

In the scanning microscope, according to the invention, the object 5 is illuminated by a light source 11 via a condensor 12 and a mirror 13. An image of the object 5 is projected by a mirror 14 onto the diaphragm 4.

The scanning microscope disclosed herein also comprises a tracing unit 15 (FIG. 1) to trace out the outline of the object 5 in the image plane, whose input accepts the electric signal from the shaper 7, a limit-coordinate detector 16 to determine points on the outline of the object 5 having extreme rectangular X- and Y-coordinates, a discrete line scanner 17 which line-scans the object 5 along the X- and Y-axes of a rectangular coordinate system, and a control unit 18. The latter is electrically connected to said units so that when a signal comes from the tracing unit 15 marking the commencement of a tracing cycle it turns off the inching motor 9 while after the tracing cycle has been completed it turns off the tracing unit 15 and turns on the discrete line scanner 17, and after the image of the object 5 has been line-scanned it turns on the inching motor 9 to move the platen 3 for the search of a next object 5.

The tracing unit 15 and the discrete line scanner 17 are electrically connected to the operating mechanism of the diaphragm 4, consisting of inching motors 19 and 20 connected to a drive unit 21.

Additionally, the scanning microscope described herein comprises a diaphragm-reset unit 22 to bring the diaphragm 4 back to the starting position in which the outline of the object 5 is intersected by the optical axis of the microscope 1, and also an intersection counter 23 to register how many times the diaphragm 4 of the optical microscope 1 intersects the outline of the object 5.

The diaphragm-reset unit 22 is electrically connected to the tracing unit 15, the control unit 18 and the diaphragm operating mechanism 4 so that when the object 5 has been line-scanned it actuates the diaphragm operating mechanism upon a signal from the control unit 18.

The intersection counter 23 is electrically connected to the tracing unit 15, the shaper 7, and the control unit 18 so that it activates the inching motor 19 upon a signal coming from the control unit 18 just as the diaphragm 4 takes up its starting position, to move the diaphragm 4 from the starting position to a point of a maximum X-coordinate on the outline of the object 5 and back at zero Y-coordinate, while counting the electric signal with a predetermined level coming from the shaper 7, and also activates the inching motor 9 to move the platen 3 for a correcting search of the next object 5.

The tracing unit 15 (FIG. 2) provided in the scanning microscope described herein uses ferrite-diode logic circuits. The extremal-coordinate detector 16 comprises a means 24 for determining the X- and Y-rectangular coordinates of the apexes of the rectangle into which the image of the object 5 inscribes, and a means 25 for determining the maximum X-coordinate of the image of the object 5 at zero Y-coordinate, which are four eight-unit reversible binaries and four binaries using ferrite-diode logic circuits.

The discrete line scanner 17 comprises means 26 and 27 to line-scan the image of the object 5 along the X- and Y-axes, respectively, which are ferrite-diode logic circuits.

The control unit 18 comprises a master oscillator 28, comparison circuits 29, 30, 31, 32, 33, 34, and 35 using ferrite-diode logic circuits and gates 36, 37, 38, 39, 40, 41, and 42.

The intersection counter 23 consists of four-unit binaries 43 and 44 using ferrite-diode logic circuits.

Referring to FIG. 2, in the scanning microscope described herein the output of the shaper 7 is connected to the input of the tracing unit 15 and also, via the gates 36 and 37, to the inputs of the binaries 43 and 44. The output digit buses of these binaries are connected to the inputs of the comparison circuit 29 whose output is connected to the input of the tracing unit 15. The outputs of the latter are connected to the inputs of the means 24 for determining the rectangular X- and Y-coordinates of the apexes of the rectangle and the means 25 for determining the maximum X-coordinate of the outline of the object at zero Y-coordinate; besides they are also connected to the inputs of the drive units 10 and 21, respectively.

The outputs of the means 24 are connected to the inputs of the comparison circuits 30 and 31, the other inputs of the circuit 30 being connected to the outputs of the means 26 and 27, and the output to the control bus of the gate 39.

The gates 38, 39, and 40 couple the master oscillator 28 to the inputs of the means 26 and 27. The gate 39 is connected to the inputs of these means 26 and 27, the control bus of the gate 38 is connected to the output of the tracing unit 15, and the control bus of the gate 40 to the outputs of the comparison circuits 31 and 32.

The outputs of the means 26 and 27 are connected to the inputs of the comparison circuits 31, 32, 33, and 34, while the other inputs of the comparison circuits 31, 32, and 33 are connected to the outputs of the means 24. The output of the comparison circuit 33 is connected to the inputs of the means 26 and 27. The inputs of the comparison circuit 34 are connected to the outputs of the means 26 and 27, and the output to the drive unit 10 over the gate 41.

The control bus of the gate 41 is connected to the output of the comparison circuit 35, one input of which is connected to the output of the means 26 and the other input of which is connected via the gate 42 to the output of the means 25.

The output of the comparison circuit 34 is connected to one of the control buses of the gate 36 and the control bus of the switch 42.

The scanning microscope described herein and using the scanning method, according to the invention, operates as follows.

The object 5 of interest is mounted on the upper platen 2 (FIG. 2) of the optical microscope 1 and is illuminated by the light source 11 by means of the condensor 12 and the mirror 13. An image of the object 5 is projected by the mirror 14 onto the diaphragm 4 and enters the optical-to-electric transducer 6.

Figure 3:
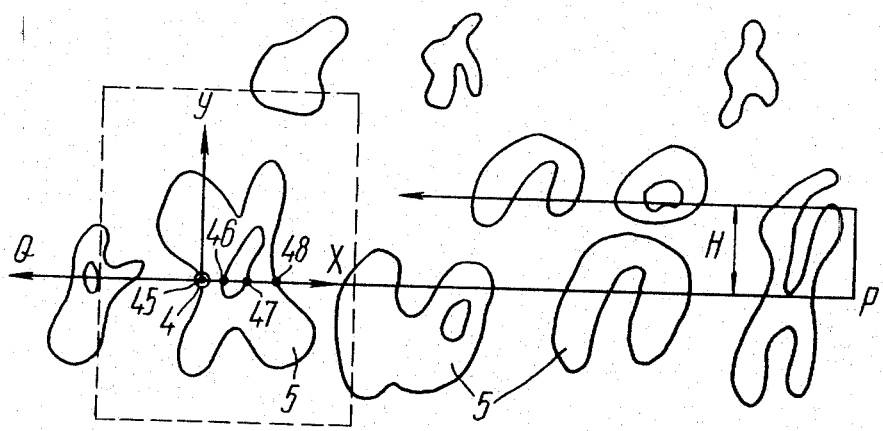
FIG. 3 is the field of vision of the scanning microscope disclosed herein, using the scanning method described, explaining the search algorithm.

The object is moved by means of the inching motor 9. The image of the object 5 formed by the microscope 1 is projected onto the diaphragm 4. Owing to the displacement of the object 5, its image moves along the line PQ (FIG. 3). When the diaphragm 4 intersects the outline of the object image, which is the starting position of the object 5 (point 45), in which the outline of the object 5 is intersected by the optical axis of the optical microscope, a change is produced in the output voltage of the transducer 6 (FIG. 2). This electric signal travels via the shaper 7 to the tracing unit 15 which activates the drive unit 10 to stop the platen 3, thereby stopping the object 5. After the object 5 has stopped, the tracing unit 15 activates the diaphragm 4 via the inching motors 19 and 20 and the drive unit 21, thereby causing the diaphragm 4 to trace out the outline of the object 5. At the same time, the means 24 "memorizes" the extreme rectangular X- and Y-coordinates of the object ($X_{min}$, $X_{max}$, $X_{min}$, $X_{max}$) (FIG. 4).

After a complete tracing cycle, that is, when the signals representing the instantaneous X- and Y-coordinates of the outline in the tracing unit 15 are zero, the end-of-tracing signal is generated which opens the gate 38, thereby allowing the signals of the oscillator 28 to reach the discrete line-scanner 17 via the open gates 38 and 39.

Upon a signal from the means 26 and 27 (FIGS. 2 and 4), the diaphragm 4 is displaced along the −X and +Y semi-axes until the signal in the comparison circuit 30 representing the instantaneous coordinates along these semi-axes is equal to the signals representing the extreme coordinates, $X_{min}$ and $X_{max}$. After the diaphragm 4 stops at point M with coordinates $X_{min}$ and $Y_{max}$, the comparison circuit 30 connects the inputs of the means 26 via the gates 39 and 40 and causes the diaphragm 4 to move along the +X semiaxis until the signal in the comparison circuit 32 representing the instantaneous coordinate along that semiaxis is equal to the signal representing the coordinate $X_{max}$. At that instant, the comparison circuits 32 switches from the +X to the −X input and sends out a signal to move the diaphragm 4 one step on along the −Y semiaxis. After that, the diaphragm 4 moves along the −X semiaxis until the signal in the comparison circuit 31, representing the instantaneous coordinate along that semi-axis is equal to the signal representing the extremal coordinate $X_{min}$. At that instant, the comparison circuit 31 switches from the −X to the +X input and causes the diaphragm 4 to move one step on along the −Y semiaxis. In this way, the image of the object 5 is line-scanned within a rectangle having as its apexes the points with extreme rectangular coordinates on the outline of the object 5.

Figure 4:
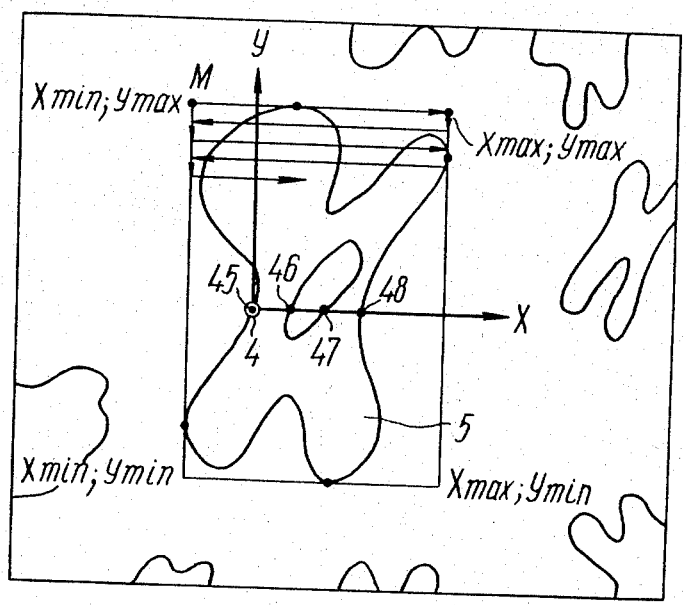
FIG. 4 is an object bounded by a rectangle which has as its apexes the points with extreme X and Y coordinates and within which the line scan is performed, and also adjacent objects.

At the instant when the signal representing the instantaneous ordinate of the image in the comparison circuit 33 is equal to the signal representing the extreme ordinate $Y_{min}$, the comparison circuit 33 sends a signal to the means 26 and 27 to reset the diaphragm 4 (to point 45 in FIGS. 3 and 4). The diaphragm is reset by the unit 22. In the embodiment being described, the functions of the unit 22 are performed by the means 26 and 27 which count back until a zero signal appears on their output buses.

After the diaphragm 4 has been reset, the comparison circuit 34 opens the gates 42 and 36, and the signal representing the maximum X-coordinate at zero Y-coordinate which was "memorized" while the means 25 was tracing the outline of the object 5 is fed via the gate 42 to the comparison circuit 35 which compares this signal with that representing the instantaneous +X coordinate. As this is done, the diaphragm 4 moves from the starting position along the +X semiaxis. At the same time, the open gate 36 routes the signals from the shaper 7 to the binary 43 where the signals exceeding a predetermined level (points 45, 46, 47, and 48 in FIGS. 3 and 4) represent the outline of the object. At the instant when the instantaneous X-coordinate equals the maximum X-coordinate at zero Y-coordinate, the comparison circuit 35 closes the gate 36 and opens the gate 41, thereby sending a signal to the means 26 to reset the diaphragm 4. After that, the comparison circuit 34 sends a signal via the gate 41 to the drive unit 10 to move the object 5 along the line PQ and closes the gate 38.

Now, the gate 37 opens, and the signals from the shaper 7 reach the input of the binary 44. The comparison circuit 29 compares the information accumulated by the binary 43 with that accumulated by the binary 44. When the two amounts are equal, the comparison circuit 29 applies a signal to the tracing unit 15, indicating that the next signal at the output of the shaper 7 will correspond to the intersection of the outline of the object 5 by the diaphragm 4. At that instant, the tracing unit 15 again stops the object, and the cycle is repeated all over again.

In this way, the image of the object can be scanned along the line PQ whose length is determined by the travel of the platen 3 of the stage of the optical microscope 1. At the ends of travel of the platen 3, the drive unit 10 moves the object 5 at right angles to the line PQ through a predetermined step H (FIG. 3) set by the operator for observation of the next stripe.

The scanning microscope disclosed herein and using the scanning method according to the invention, scans the image of each object in the center of the field of vision of the optical microscope, eliminates partial coverage of the object by the scanned field, and examines a field considerably greater than the field of vision of the optical microscope. Additionally, this scanning microscope reads into a computer only information pertinent to the image of the object and operates at the maximum resolving power of the optical microscope, without limiting the size of the observed field.

The scanning microscope using the described scanning method also reduces to $\pm 1$ per cent the background variations across the image field.

The combination of the above-listed properties makes it possible to automate the read-in of data on the geometrical and optical characteristics of objects under investigation into a computer.

What is claimed is:

1. A scanning method comprising moving an object under investigation to a starting position in which the outline of the object is intersected by an optical axis of a fixed optical system; converting the optical signal of said optical system to an electrical signal from which the optical and geometrical characteristics of the object are to be evaluated; tracing the outline of the image of the object; determining the extreme X- and Y-rectangular coordinates of the image of the object; line scanning the image of said object within a rectangle whose apexes corresponds to said extreme X- and Y- rectangular coordinates on the outline of said object, moving said image, after said image of said object has been line-scanned, to a position corresponding to the starting position at which the outline of the object is intersected by the optical axis of said optical system; additionally moving said image along a line intersecting said optical axis of said optical system and parallel with and opposite in direction to the line of travel of said object to said starting position, while counting how many times the outline of said image is intersected by said optical axis of said optical system, then displacing said image to said starting position, thereafter displacing said object from the starting position further along its line of travel, while counting how many times the outline of said object is intersected by said optical axis of said optical system; and comparing the two intersection counts.

2. A scanning microscope using line scanning and comprising: an optical microscope producing an optical signal in the form of an image of an object; a stage of said optical microscope to mount said object; an operating mechanism to move said stage; a diaphragm arranged to lie in the image plane of said object; a transducer to convert said optical signal into an electrical signal carrying information about the optical and geometrical characteristics of said object; a tracing unit to trace the outline of said object in the image plane, said tracing unit having an input which receives said electric signal from said optical-to-electric transducer; a limit coordinate detector to determine the extreme X- and Y-rectangular coordinates of the object, said limit coordinate detector being electrically connected to said tracing unit; a discrete line scanner to line-scan the image of said object along the X- and Y-axes of a rectangular coordinate system, said line scanner being electrically connected to said limit coordinate detector; a control unit electrically connected to said tracing unit, said limit coordinate detector and said discrete line scanner so that when a signal comes from said tracing unit that a tracing cycle has begun it turns off said stage operating mechanism, while after the outline of said image has been traced out it turns off said tracing unit and turns on said discrete line scanner, and after the image of said object has been line-scanned it turns on said stage operating mechanism to search another object; a diaphragm operating mechanism electrically connected to said tracing unit and said discrete line scanner; a diaphragm reset unit to bring said diaphragm to a starting position in which the outline of said object is intersected by the optical axis of said optical microscope, said diaphragm reset unit being electrically connected to said tracing unit, said control unit and said diaphragm operating mechanism so that when the image of said object has been line-scanned it activates said diaphragm operating mechanism upon a signal from said control unit; an intersection counter to determine how many times said diaphragm intersects the outline of said object, said intersection counter being electrically connected to said tracing unit, said optical-to-electric transducer and said control unit so that upon production of a signal coming from said control unit as said diaphragm is reset, the intersection counter actuates said diaphragm operating mechanism, to move it from said starting position to a maximum X-coordinate and back, while counting the number of electrical pulses with a predetermined level coming from said optical-to-electrical transducer and also activates said stage operating mechanism for a correcting search of the next object.

* * * * *